Nov. 7, 1933.   A. AMES, JR., ET AL   1,933,578
EYEGLASSES FOR CORRECTING RETINAL IMAGE ASYMMETRY
Filed Aug. 13, 1929
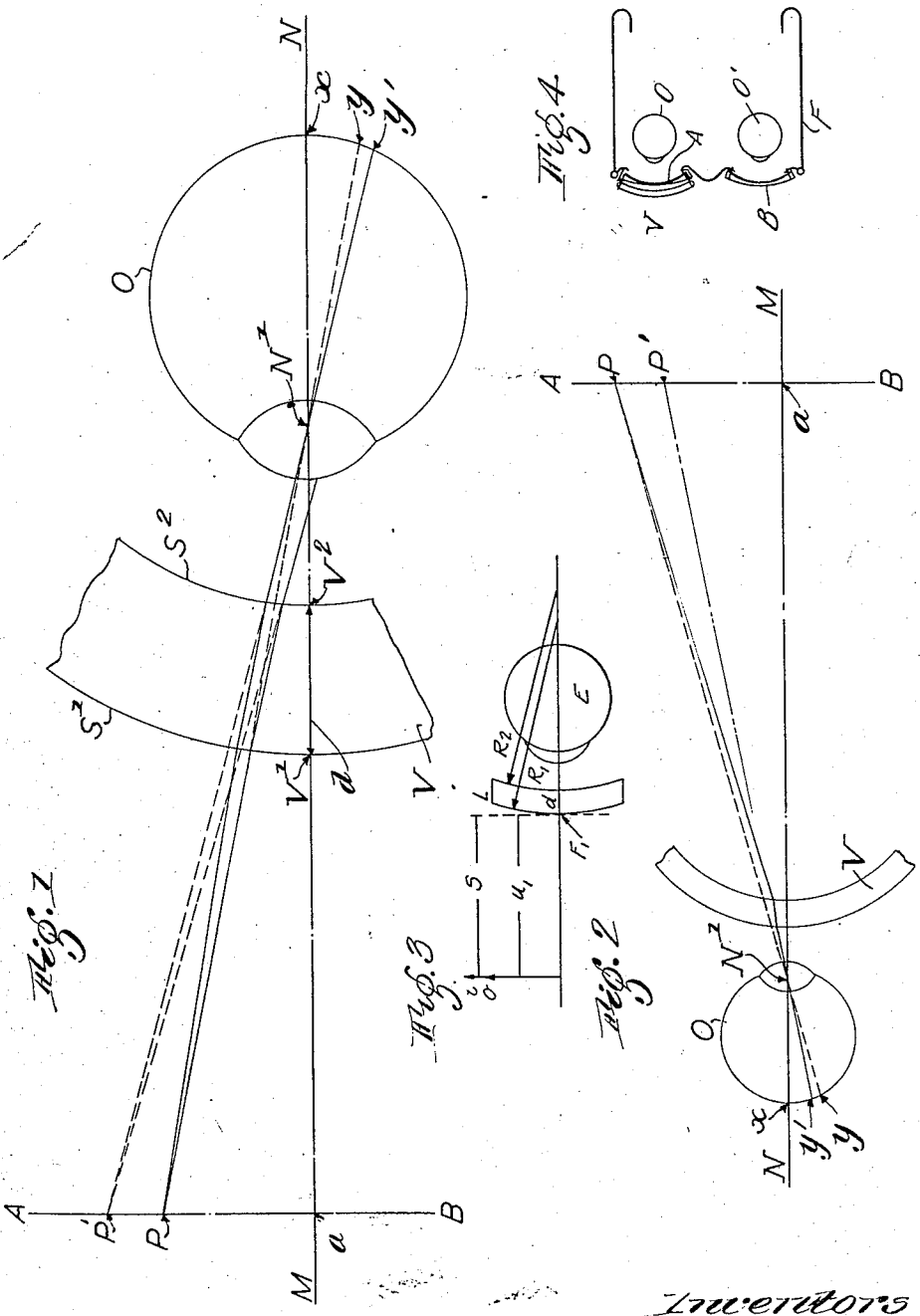
Inventors
Adelbert Ames Jr.
Gordon H. Glidden
by Roberts, Cushman & Woodberry
their Attorneys.

Patented Nov. 7, 1933

1,933,578

UNITED STATES PATENT OFFICE

1,933,578

EYEGLASSES FOR CORRECTING RETINAL IMAGE ASYMMETRY

Adelbert Ames, Jr., and Gordon H. Gliddon, Hanover, N. H., assignors to Trustees of Dartmouth College, Hanover, N. H., a corporation of New Hampshire Application August 13, 1929. Serial No. 385,610

26 Claims. (Cl. 88—54)

It has been found that very serious ocular conditions arise when the retinal picture formed in one eye differs in size from that formed in the other. This difference in size, which we call retinal image asymmetry, may be due to difference in size of the optical images formed on the retina by the lens system of the two eyes (or the eye lens system and correcting eye glasses) which we call image asymmetry, and/or to retinal anatomical differences leading to asymmetrical perception by the retinas of the two eyes of wholly like images, which we call anatomical asymmetry.

Lack of registry of the retinal pctures of the two eyes may arise from one picture being larger or smaller than the other in all dimensions, or one picture may be larger or smaller than the other in only one dimension, or may be larger in one dimension and smaller in the other, or vice versa. A difference in size of less than one-half of one per cent has been found to cause marked discomfort.

The above described differences are determinable by means of the apparatus for measuring retinal asymmetry described in our application for United States Letters Patent, Serial No. 385,611 filed of even date herewith.

One way of correcting differences in size of retinal images is to put a plus lens before the eye having the smaller image or a minus lens before the eye having the larger image. A spherical lens is used if the image is larger or smaller in all dimensions; a cylindrical lens is used if the image is larger or smaller in one meridian, the power (refractive effect) of the cylinder being put in that meridian that is too large or too small, according to the use of a negative or positive cylindrical lens. Such means we have many times employed, and where the difference in size is very slight, so that powers over 0.50D do not have to be used, these lenses work very well, subject however to a usually tolerable defect that will be mentioned later.

Where the difference in size of the retinal pictures is greater so that lenses over 0.50D have to be used, it has been found that the vision is made too blurred by the power of correcting lenses. This is due to the change of the exterior focal distance by refraction of a lens of suitable magnifying power.

This out of focus condition can be overcome by a telescopic combination known to the art such as is used to correct the size of the retinal pictures when the crystalline lens of one of the eyes has been removed. Of course with the relatively slight differences we are dealing with, very much weaker lenses can be used. We have successfully used such combination of lenses. They have been found to be very inconvenient for general use as they consist of one element at a considerable distance in front of the other.

Our invention herein described is characterized by improved and simpler means for effecting such corrections, involving the use of glass plates of no optical power, which may be flat, spherical, aspherical or cylindrical.

In the accompanying drawing,

Fig. 1 is an exaggerated diagram explanation of the optical effect of a refractory plate V having inner and outer cylindrical or spherical surfaces;

Fig. 2 is a similar diagram illustrating the effect of a similar refracting plate used in the opposite sense.

Fig. 3 is a diagrammatic view illustrating the method of designing a size changing lens; and Fig. 4 is a diagrammatic showing of spectacles according to our invention.

In these diagrams A B is the object field, in which the point $a$ is on the axis of the eye O. Without the interposition of a transparent dense refracting plate V of no optical power, depended upon to displace images of objects off the optical axis, the retinal image of the point P is at $y$. The plate V has anterior convex and posterior concave surfaces, Fig. 1, whose vertices may be on axis M N at $V_1$ and $V_2$ respectively, the refractive effect of which plate is to form the image of point P at $y'$, the retinal image displacement from the axis M N normally measured by the quantity $x\ y$ having become the greater quantity $x\ y'$; as a consequence the apparent place in the object field of point P is at P'; and if the surfaces of V are spherical every point of the object field in the plane of Fig. 1 will appear to be proportionately displaced away from the point $a$ by a distance corresponding to the ratio $aP:aP'$. If the surfaces of V are cylindric (in which case Fig. 1 represents a section perpendicular to the axis of curvature) there will be the same displacement in planes parallel to said figure, and greater or lesser displacement in planes perpendicular to the plane of Fig. 1. In either case, light vergence from any point P has not been refractively altered by the effect of the body V within the angle subtended by the pupillary opening, the cone of light from such a point diverging after passage through plate V at the same angle as before such passage. The object is thus apparently at its natural distance, although dimensionally magnified in the proportion $aP:aP'$. The value of this magnification is a function of the index of refraction of the body V, its thickness and its respective anterior and posterior curvatures, and the distance $V_2\ N_1$ from the nodal point of the eye lens. These values are susceptible of exact control and determination for the purpose of securing a magnification to any small value of the proportion $aP:aP'$ which will be required to correspond to the degree of retinal image asymmetry determined by mensuration for this error of vision.

The plates V may be used in the opposite sense to secure retinal image diminishment rather than magnification by mounting in relation to the eye O, Fig. 2, with the concavity outward. In this case, the quantity $x\ y$ of the retinal image is greater than the quantity $x\ y'$, and the apparent position of the point P in the object field A B is at P' nearer the axial point $a$ than the point P.

If the image in one eye is smaller than that in the other by the same ratio in all dimensions the images can be made equal by putting a spherical plate V before the eye with the smaller image with the concave side of the sphere towards the eye as in Fig. 1 or by putting the spherical plate before the eye with the larger image, convex side towards the eye, as in Fig. 2. The radii of curvature of the plate V, as shown in the diagrams, are obviously made exaggeratedly short for purposes of illustration. By "spherical" plate we refer, of course, to a dense transparent body whose surfaces are spheres of different radii, in the normal case nearly concentric.

If it is desired to correct the size of the retinal image in one meridian only, a cylindrical plate is used. By "cylindrical" plate we refer to a dense transparent body whose surfaces are cylinders of different radii, in the normal case nearly concentric about the same axis.

The amount of change of size produced by these plates P, the index of refraction being assumed to be constant, depends upon their curvature and thickness. Useful curvatures vary in radius of curvature from infinity to $\pm 25.0$ mm. Useful thicknesses vary from one millimeter to five or six. A spherical plate with radii of $R_1=87.17$ (front surface) and a thickness of 2.07 mm., concave side towards the eye: $R_2=87.14$ (back surface), will increase the size of the image about 1% if the object is at 400 mm. (2.5D.); while a spherical plate with $R_1=87.17$ mm. (front surface) and $R_2=86.56$ mm. and a thickness of 1.86 mm. increases the size of the image about 0.75 or 1% if the object is at 6096 mm. (20 ft.).

The relative nature and amount of change in size from the line of vision outward depends upon the combination of curvature and thickness.

Due to the fact that the front and back surfaces of these plates are of such curvature that no optical power is produced, a change of the size of an image can be brought about without in any way affecting the accommodation or blurring the image, that is, size change is effected without power change. The vergence angle of light entering the eye from the object is not changed, as in the case of lenticular or solid cylinder segment refractors; the apparent size of the object is not associated with change in its apparent distance, and a difference in accommodation of the eye lens is not induced. For these reasons such plates should be used instead of lenses even where the correction for difference in size is very slight and can be effected by means of lenses of less than 0.50D; for, even though with such weak lenses the visual acuity may be passable, yet an accommodative imbalance is brought about, which increases with the power used, and which be avoided in all cases, if only for the reason that the limit of tolerance is insusceptible of definition, and probably varies with individuals.

These lenses are designed to have no focal power when they are at a specified distance before the eye with an object at a specified distance.

By the term "zero power" it is meant that the lenses do not change the vergence of the incident light, that is the object and the final image are at the same place. Schematically this is shown in Figure 3.

Let E represent an eye with a zero power lens L placed before it so that the first surface of the lens is at the anterior focus of the eye $F_1$. An object of size $o$ is placed at the distance $u_1$ from the first surface of the lens which has a front radius $R_1$, a back radius $R_2$ and a thickness $d$. The final image of size $i$ is formed at the distance $s$ from the first surface of the lens.

When light from the object $o$ at a distance $u_1$ from the first surface of the lens strikes the first surface of the lens, it will be imaged at some distance $v_1$ measured from the first surface of the lens. This image will now become an object for the second surface of the lens at a distance $u_2$ from the second surface of the lens and will be imaged at a distance $v_2$ measured from the second surface of the lens. If the lenses are to be zero power lenses, then we must have the fundamental rule that $v_2$ shall equal $s+d$ where $s=u_1$. Secondly, $u_2$ must equal $v_1-d$.

The refraction of light at the first surface will form an image of the object $o$ according to the Equation (3):

$$\frac{n_2}{v_1}-\frac{n_1}{u_1}=\frac{n_2-n_1}{R_1}$$

In this equation $n_2$ is the index of refraction of the glass and $n_1$ is the index of refraction of the medium containing the glass. In the final form $n_1=1$ and $n_2$ is written without a subscript. The equation which gives the refraction at the second surface of the lens is as follows:

$$(4)\quad \frac{n_1}{v_2}-\frac{n_2}{u_2}=\frac{n_1-n_2}{R_2}$$

The fifth equation will give us the final magnification produced by the lens, which is:

$$(5)\quad M=\frac{I}{O}=\frac{v_1 v_2}{u_1 u_2}$$

This magnification formula (5) is of course the result of the products of the magnification produced at the two surfaces of the lens, the magnification produced by the first surface being $$\frac{v_1}{u_1}$$

and the magnification produced by the second surface being $$\frac{v_2}{u_2}$$

There are, then, the following five formulæ which represent the working equations which are used in designing the size lenses.

(1) $v_2=s+d$.

(2) $u_2=v_1-d$.

(3) $\dfrac{n}{v_1}-\dfrac{1}{u_1}=\dfrac{n-1}{R_1}$ (4) $\dfrac{1}{v_2}-\dfrac{n}{u_2}=\dfrac{1-n}{R_2}$ (5) $M=\dfrac{v_1 v_2}{u_1 u_2}$ The symbols are defined as follows:
$R_1$=radius of the first surface.
$R_2$=radius of the second surface.
$d$=the axial thickness of the lens.

$n$ = the relative index of refraction of the glass.
$u_1$ = the object distance of the first surface measured from the pole of the first surface.
$v_1$ = the image distance of the first surface measured from the pole of the first surface.
$u_2$ = the object distance of the second surface measured from the pole of the second surface.
$v_2$ = the image distance of the second surface measured from the pole of the second surface.
$s$ = the distance of the final image measured from the first surface.
$O$ = the size of the original object.
$I$ = the size of the final image.
$M$ = the magnification produced by the lens.

The foregoing gives the general theory and the formulæ which are used in the designing of a zero power magnifying lens. In order to put these formulæ in more workable form, it is necessary to make certain modifications, which will be described in the following pages.

In general there is an object at a specified distance and it is desired to design a zero power lens which will produce a desired magnification when the lens is placed at a given distance in front of the eye. These lenses are usually computed for a position before the eye in which the front surface is assumed to be at the anterior focus of the eye. In general there are three factors to be considered: The radius of the first surface, the radius of the second surface and the thickness. If a definite magnification is desired and the curvature of the front surface $R_1$ is specified, then the thickness $d$ and the curvature of the rear surface $R_2$ may be solved for. Secondly, if the thickness $d$ is specified then the front curve $R_1$ and the rear curvature $R_2$ may be solved for. Thirdly, if the rear curvature $R_2$ is assumed, then the thickness $d$ and the curvature of the front surface $R_1$ may be solved for. Let it be assumed that it is desired to design a lens of specific magnification and known thickness. It will therefore be necessary to solve for the radius of curvature $$A = -u_1(u-1)d$$
$$B = nu_1 - d$$
$$C = n(s-d)$$

$$A = -(u-1)(s-d)$$

for the front surface and then the radius of curvature for the back surface.

To determine the radius of the first surface $R_1$, a working formula of the following type is used:
$Axy + By = C$ in which $$x = \frac{1}{R_1}, \quad Y = \frac{I}{O}$$

the linear magnification.

The constants A, B and C are defined as follows:
$A = -u_1(n-1)d$.
$B = nu_1 - d$.
$C = n(s-d)$.

For a given magnification a value is assigned to $y$ and for a given thickness a value is assigned to $D$. The above equation is then solved for $x$ and so obtain $R_1$.

The following is a sample computation for a size lens which is to produce a diminution of 2% ($y = 0.98$) when the thickness $d$ of the lens is assigned as approximately 3.288. The original object is placed at a distance of 20 feet from the first principal point of the relaxed eye. This is equivalent to 6096.00 mm. The front surface of the lens is to be placed at the anterior focus of the eye, which is 17.12 mm. from the first principal point of the eye. This means, then, that $u_1$ is equal to 6078.88, which is the object distance and which must also be equal to $s$. The index of the glass $u = 1.5232$. Having solved for $R_1$, the next step is to obtain the value of $R_2$ for this particular lens. For this a formula of the form $A'x + B'y = C'$, where $$x = \frac{1}{R_2}$$

and $$Y = \frac{I}{O}$$

the linear magnification is used. The constants are defined as follows:
$A' = (1-n)(s-d)d$.
$B' = nu_1$.
$C' = n(s-d) + d$.

Substituting the values in this equation, solve for $x$ and so obtain $R_2$. For this particular lens $$R_1 = 54.8030 \quad R_2 = -55.9734 \text{ and } d = 3.288.$$

In this manner $R_1$ and $R_2$ may be determined for a lens of specified thickness and desired magnification. The following is the actual determination of the radii:

FIRST SURFACE $$Axy + By = C$$

$u_1 = -6078.88$    $A = 10456.16221699$
$n = 1.5232$    $B = -9262.6376314$
$s = -6078.88$    $C = -9264.357718$
$d = 3.2876154$
$Y = 0.98$
$B = -9262.6376314$
$A = +10456.16221699$
$Ay = +10247.038956$
$C = -9264.357718$
$By = -9077.384877$
$C - By = -186.972841$ $$x = \frac{C - BY}{AY} = -0.0182465239$$

$1/x = R_1 = -54.804959$

SECOND SURFACE $$Ax + By = C$$

$d = 10461.8171738$   $u_1 = -6078.88$   $d = 3.2876154$
$B = uu_1 = -9259.3500160$   $u = 1.5232$
$C = u(s-d) + d = -9261.0701034$   $s = -6078.88$
$Y = 0.98$
$A = 10461.8171738$
$B = -9259.3500160$
$By = -9074.1630196$
$C = -9261.0701034$
$C - By = -186.9070838$ $$x = \frac{C - By}{A} = -0.0178656423$$

$R_2 = 1/x = -55.973358$

Such spherical and cylindrical plates have a great advantage over the telescopic combination above mentioned in that they consist of one part instead of two separated parts, are lighter, less expensive, easier to use, give a greater range of variations, and less oblique aberrations.

In practice any other refractive correction that the patient's eyes may call for, either spherical or cylindrical may be combined with these plates into a single glass, which is not distinguishable in appearance from an ordinary eye-glass.

A particular use of such plates where the difference in the size of the retinal pictures is due to image asymmetry is found where anatomically the retinas of the two eyes are the same but where one eye alone has astigmatism. For proper ocular condition the visual refraction of both eyes should be corrected and the visual acuity made the same. A cylindrical glass that corrects this astigmatism, however, will cause the image in that eye to be of different size from the image of the other eye in the meridian of the power of the cylinder used. This difference in size may produce a very harmful ocular condition. It can be corrected only by equalizing the sizes of the images in the two eyes. This can be done by means of a cylindrical plate so placed before either one eye or the other as to compensate for the distortion introduced by the cylinder used to correct the astigmatism. The patient is then provided with corrected vision in both eyes and retinal pictures of the same size.

Another particular use of such plates is where the retinal pictures of a patient's two eyes are of the same size but the accommodation of one eye is different from that of the other. For proper visual condition the accommodation of the two eyes should be the same. A plus or minus lens making such a correction however will produce different sized retinal pictures. To correct this difference in size the lens should be combined with a spherical plate of the strength that will offset the difference in size which the lens introduces.

A third form of asymmetry is that where the refractive condition of both eyes is the same but where the image perceived by one eye is different from the other. This anatomical asymmetry is correctable by using a proper curved plate of the kind above described to change the dimension of the actual retinal image to correspond with the anatomical asymmetry. Where the patient should have a refractive correction this plate is combined with lenticular surfaces for making the correction.

The most common form of retinal asymmetry is a combination of two or more of the above particular cases.

In practice these plates may advantageously be made up in sets as follows:

1. Set of spherical plates that give increases and decreases in size of retinal image in steps of ¼ of 1% from ¼% to 15%.
2. Set of cylindrical plates that give increases and decreases in size in steps of ¼ of 1% from ¼% to 15%.
3. Set of spherical plates combined with spherical lens surfaces that will give steps in plus and minus power of 0.12 diopters from 0 to 3.00D but no change in size.
4. Set of cylinders with refractive optical cylindrical surfaces that will give steps in plus and minus power of 0.12 diopters from 0 to 3.00D.

These sets may be used in testing eyes just as present test sets are used, different lenses being placed before the patient's eyes until the refraction and size of retinal pictures in both eyes are corrected, and afford a series capable of being identified for prescription of such correctors for the eyeglass maker.

Means for dimensional alteration of a retinal image without change of light vergence are exemplified by a plate of refractive material, of no optical power, either of spherical, cylindrical, or sphero-cylindrical configuration, according to the specific character of the dimensional disparity between the uncorrected retinal images of a pair of eyes.

With such means for correction of dimensional disparity there may be incorporated a lens-element, either spherical, cylindrical, or spherocylindrical, for producing changes in light vergence corrective of refractive ocular defects. In each case, it will be understood without further description, the correcting plates are to be mounted in predetermined relation to the patient's eyes in suitable frames like other eyeglasses. As for example illustrated in Fig. 4. In this figure, O and O' are the eyes, A and B are conventional lenses which are in this example shown as of negative power for correcting a refractive defect, V is the size lens which changes the image size of eye O to that of eye O', and F is a frame for holding the lenses in place in proper relation to the eyes. In the case of the cylindrical plates, the usual elliptical or rounded segment of the refracting body will not have edges lying in a single plane for framing, but in the usual case this arched shape is not sufficiently pronounced to require frames noticeably bent, the depth of the mounting groove serving to accommodate the arched edges.

From the foregoing it will be evident that this invention affords an optical correction independent of the usual corrections which depend upon the algebraic sum of the powers of the individual elements or surfaces. Thus in the application of the invention to a particular eyeglass the aforesaid size correction is effected, by adjusting the magnitude of the individual power elements and their axial positions relatively to the eye, without changing the algebraic sum of the powers of the elements. For example, if an eyeglass lens having a plus one surface on each side is replaced by a lens having a minus ten surface toward the eye and a plus twelve surface on the other side, the usual correction is substantially unchanged inasmuch as the algebraic sum of the powers of the two surfaces is the same in each case, but the size of the retinal image is altered by the change in the magnitude of the individual power elements and also by the change in distance from the surfaces of the lens to the nodal point of the eye.

It will also be evident that, in one aspect of this invention, the aforesaid asymmetry is corrected by correlating the degree of cupping (curvature) (taking into account the thickness of the lens elements) to the asymmetry to be corrected, either with or without correcting errors of focus in the usual way by algebraic sum of surface powers. Thus, in the simple case where no corrections other than size are required, a single lens having substantially parallel surfaces and substantially uniform thickness serves to correct the error in size if the degree of cupping corresponds to the asymmetry of the retinal pictures. In the case where other corrections are required they are effected in the usual way by adjustment of the algebraic sum of surface powers of the lens elements, and the error in size is corrected by making the degree of cupping corresponding to asymmetry without changing the algebraic sum of the surface powers which correct the other errors. As pointed out above both kinds of correction may be effected with a single lens having two effective surfaces or with a composite lens having four (or more) effective surfaces; in the first case correction of focus depends upon the algebraic sum of the powers of the two surfaces and correction of size depends upon the degree of cupping of the lens; in the second case the correction of focus depends upon the algebraic sum of the powers of all the surfaces in series and the correction of size by degree of cupping depends upon the combined cupping of all the elements.

It will also be evident that, in another aspect, this invention involves the correction of asymmetry between the retinal pictures produced in a pair of eyes by light rays reflected from an object field to the eyes respectively, characterized by altering the angle subtended by rays of light at the nodal point of one eye relative to the angle subtended by rays from the same points of the object at the nodal point of the other eye, by laterally shifting the rays in transit from the object to the eye, in opposite directions on opposite sides of the axis of the eye, in proportion to the asymmetry and independently of change of vergence, that is, either without change of vergence or by means which does not affect the vergence as, for example, by a lens having parallel surfaces in series with an ordinary corrected lens or by making the degree of cupping of an ordinary corrected lens proportionate to the asymmetry without changing the power of the lens. When the asymmetry is greater in one principal meridian than in the other the lateral shifting is different in one meridian than in the other, and when equal in all meridians the lateral shifting is radial.

In another aspect the invention involves a difference, between the lenses before the respective eyes of a pair of eyes, which corresponds to the dimensional inequality or asymmetry and which is substantially equal to a parallel surface concave lens adapted to alter the angle subtended by rays of light at the nodal point of one eye relatively to the angle subtended by rays from the same points of the object at the nodal point of the other eye, with the concave side of the parallel surface lens directed toward the eye whose retinal picture is to be enlarged or vice versa, that is with the opposite side toward the eye whose retinal picture is to be reduced. This difference may be effected by mounting a parallel surface lens over one of two like lenses, as shown in Figure 4, or by making the corrective lenses before the two eyes with an equivalent difference as above referred to.

We claim:

1. In an eyeglass for the correction of asymmetric retinal images, means for equalizing dimensions of unequally dimensioned retinal images without alteration of light-vergence, comprising a plate of transparent refractive material of no optical power having surfaces of curvature adapted when interposed between one eye and its object field to equalize dimensionally by refractive displacement of light from the object in accordance with deviation from the axis of the eye, the retinal image of its object field in that eye, with that of the other eye, and combined with means for changing light vergence for the correction of other optical peculiarities.

2. An eyeglass for correcting dimensional inequality between the retinal pictures of a pair of eyes, comprising lens surfaces whose powers are proportioned to the dimensional inequality and means for holding the surfaces in position to correct said dimensional inequality by impressing upon the rays to one eye a deflecting action of a parallel surface lens having its concave surface directed toward the eye whose retinal picture is to be enlarged or vice versa.

3. An eyeglass for correcting dimensional inequality between the retinal pictures of a pair of eyes, comprising concave and convex lens surfaces having individual powers which, when the surfaces are held in predetermined axial positions in relation to one eye, alter the angle subtended by rays of light at the nodal point of that eye relative to the angle subtended by rays from the same points of the object at the nodal point of the other eye, in proportion to said dimensional inequality, and having the effect of a parallel surface lens having its concave surface directed toward the eye if the size of the image of that eye is to be increased and vice versa, and means for holding said surfaces in said positions relative to the eye.

4. Eyeglasses for correcting dimensional inequality between the retinal pictures of a pair of eyes, comprising a frame for holding lenses in fixed position before the eyes respectively, lenses in the frame having a difference corresponding to said inequality and substantially equal to a parallel surface concave lens which alters the angle subtended by rays of light at the nodal point of one eye relatively to the angle subtended by rays from the same points of the object at the nodal point of the other eye and which has its concave side toward the eye whose retinal picture is smaller.

5. An eyeglass according to claim 3 further characterized by two surfaces shaped for correction involving change of vergence and two surfaces which are substantially circular in cross-section.

6. An eyeglass according to claim 3 further characterized by two corrective surfaces shaped for correction involving change of vergence and two surfaces which are substantially circular in cross-section and substantially parallel.

7. An eyeglass according to claim 3 further characterized by two lens elements secured in fixed superposed relationship.

8. An eyeglass according to claim 3 further characterized by two elements having four surfaces, two of the surfaces being substantially circular in cross-section and the other two surfaces being shaped for correction involving change of vergence.

9. An eyeglass according to claim 3 further characterized by a plurality of lens elements secured in fixed superposed relationship and having coordinated surfaces to impart a correction involving change of vergence in addition to said correction for dimensional inequality.

10. An eyeglass according to claim 3 further characterized in that said concave and convex surfaces are on one piece of lens medium and in that the surfaces have incorporated therein a correction involving change of vergence in addition to a correction for dimensional inequality.

11. An eyeglass according to claim 3 further characterized by lens cupping in proportion to said dimensional inequality.

12. An eyeglass according to claim 3 further characterized by lens cupping in proportion to said dimensional inequality and by an algebraic sum of powers substantially affecting the vergence of the rays.

13. An eyeglass according to claim 3 further characterized by only two glass-air surfaces, these surfaces being shaped for correction involving change of vergence and the lens being cupped in proportion to said dimensional inequality.

14. Eyeglasses according to claim 4 further characterized by four superposed surfaces, two of which are shaped for correction involving change of vergence and two of which are substantially circular in cross-section.

15. Eyeglasses according to claim 4 further characterized by four superposed surfaces, two of which are shaped for correction involving change of vergence and two of which are substantially circular in cross-section and parallel.

16. Eyeglasses according to claim 4 further characterized by two lens elements secured in said frame in fixed superposed relationship.

17. Eyeglasses according to claim 4 further characterized by two superposed elements having four surfaces, two of the surfaces being substantially circular in cross-section and the other two surfaces being shaped for an optical correction involving change of vergence.

18. Eyeglasses according to claim 4 further characterized by a plurality of lens elements secured in said frame in fixed superposed relationship and having coordinated surfaces to impart a correction involving change of vergence in addition to said correction for dimensional inequality.

19. Eyeglasses according to claim 4 further characterized in that at least one of said lenses in the frame consists of one piece having incorporated therein a correction involving change of vergence in addition to a correction for dimensional inequality.

20. Eyeglasses according to claim 4 further characterized by lens cupping in proportion to said dimensional inequality.

21. Eyeglasses according to claim 4 further characterized in that one of said lenses in the frame has only two glass-air surfaces, these surfaces being shaped for correction involving change of vergence and the lens being cupped in proportion to said dimensional inequality.

22. Eyeglasses according to claim 4 further characterized by lens cupping in proportion to said dimensional inequality and by an algebraic sum of powers substantially affecting the vergence of the rays.

23. An eyeglass according to claim 3 further characterized in that said surfaces are shaped to change the size of the retinal picture in one meridian relative to the size in another meridian, substantially independently of change of focus.

24. Eyeglasses according to claim 4 further characterized in that said difference involves a correction for changing the shape of one retinal picture to conform more closely with the shape of the other retinal picture, substantially independently of change of focus.

25. Eyeglasses for correcting inequality between the retinal pictures produced in the brain through the lenses of a pair of eyes, comprising a frame for holding lenses in fixed position before the eyes, lenses in the frame correlated with the lenses of the eyes together to produce retinal pictures of substantial equality of size, the lenses in the frame having a difference corresponding to the inequality when using only the lenses of the eyes, said difference being substantially equal to a no-power concave lens having its concave side toward the eye whose retinal picture is smaller.

26. Eyeglasses according to claim 25 further characterized in that said difference involves a correction for changing the shape of one retinal picture to conform more closely with the shape of the other retinal picture.

ADELBERT AMES, Jr.
GORDON H. GLIDDON.